March 17, 1964 H. E. LAWSON ETAL 3,125,467
ELECTRODE ARRANGEMENT FOR A BATTERY
Filed June 6, 1960 2 Sheets-Sheet 1

INVENTORS
OLIVER E. ACCOUNTIUS
BOBBY K. DISNEY
BY HERBERT E. LAWSON

ATTORNEY

INVENTORS
OLIVER E. ACCOUNTIUS
BOBBY K. DISNEY
BY HERBERT E. LAWSON

ATTORNEY

United States Patent Office 3,125,467
Patented Mar. 17, 1964

3,125,467
ELECTRODE ARRANGEMENT FOR A BATTERY
Herbert E. Lawson, Glendora, Bobby K. Disney, Covina, and Oliver E. Accountius, Sierra Madre, Calif., assignors to Aerojet-General Corporation, Azusa, Calif., a corporation of Ohio
Filed June 6, 1960, Ser. No. 34,089
4 Claims. (Cl. 136—83)

This invention relates to batteries and the method of their construction, and more particularly to a construction that eliminates conventional battery separators.

A principal object of our invention is to provide a novel battery having improved discharge characteristics.

Another object of our invention is to provide a battery of improved rigid construction.

Yet another object of our invention is to provide a battery of a simplified construction.

Heretofore in voltaic cells it is customary to place a soluble metal anode and an oxidizing cathode in a suitable conductive electrolyte. To obtain maximum voltage on discharge it is customary to place the two electrode faces as close together as possible and thus reduce the thickness and consequently the resistance of the electrolyte layer. In certain wet batteries the electrodes are placed so close together that there is danger of a short circuit occurring between them which is avoided by interposing a nonconductive diaphragm or separator. This type of construction is used, for example, in automotive batteries and in various special batteries which use silver chloride and zinc or magnesium electrodes.

During the discharge of a battery end products are formed. If these end products are not removed by dilution, diffusion, or other means, they interfere with the continued operation of the battery. For example, in a conventional cell using silver chloride and zinc as the reactants together with an aqueous electrolyte the end products formed are zinc chloride and metallic silver. If, as in conventional practice, a porous diaphragm is placed between the electrodes then zinc salts soon clog the diaphragm and the electrolytic conductivity between the electrodes is greatly reduced. This results in an increased internal resistance of the cell.

Any current passing from an electrode to an electrolyte causes a chemical change. The term polarization is used to denote not only the effect produced on the electrode of a cell by the deposition on them of the gases liberated by the current but also the potentials at the electrodes which result from these changes. The effect of polarization is to decrease the current generated by an electrolysis cell and therefore the energy consumed in the process. From a practical standpoint it is important to be able to reduce polarization. Substances which achieve this end are called depolarizers. For instance, the polarization of a cathode at which hydrogen is being evolved may be diminished by the addition of some substance which will react with the hydrogen.

Cathodic depolarizers are those substances which either take up hydrogen or yield oxygen, or do both simultaneously. A cathodic depolarizer is therefore reduced at the cathode during electrolysis. Anodic depolarizers are oxidizable substances.

The insoluble end product of most depolarizers is electrically nonconductive, so the fact of reduction of the nonconductive depolarizer does not in itself have an effect on the battery cell's internal resistance. However, there is a certain class of nonconductive depolarizers which yield a highly conductive metallic "sponge" upon reduction. These depolarizers are, for instance, copper, mercury, and silver salts. When using such compounds in the past it was discovered that during reduction of such depolarizers as, for example, silver chloride, or copper oxide, the comparatively nonconductive depolarizer first reduces at the point of contact between the depolarizer and the conductive metallic connection which serves as the positive pole of the battery. The conductive metallic residue of copper or silver metal, respectively, forms a porous film which spreads across the surface as the cell discharges. When the spongy film has completely covered the cathode then the activity of the cell is not decreased because the progressively deeper layers of depolarizer come into contact with the thickening silver layer and the electrolyte path of the cell is extended through the pores of the metallic sponge.

Simple geometry shows that when two electrodes face each other a short distance apart with the backs exposed and are immersed in the center of a considerable volume of electrolyte, then the effective electrolyte areas on the front and back faces are the same, but the electrolyte path distance from back to back is greater than that from face to face. In this case the cell resistance would be proportional to the electrode distance. But if a sufficient volume of electrolyte is available outside of the electrode block then the effective cross section of the electrolyte increases as the distance between electrodes increase and the resistance of the electrolyte path does not increase proportionately with the distance. In fact with a small increase of resistance due to the lack of diffusion of end products away from the front faces of the electrodes, the resistance of the path between them at that location will become higher than the resistance of the path between the backs through the large mass of electrolyte.

In accordance with the present invention there is provided a novel electrode arrangement in which the cathode and the anode are cemented or otherwise fastened together to form a solid block but are insulated from each other at the adjacent faces by a nonporous material. A depolarizer is attached to the cathode. The active faces are exposed outwardly in different directions and are exposed to the electrolyte by immersing the entire assembly in a surrounding volume of solution.

The foregoing and other features of the invention may be had by referring to the following description and claims taken in conjunction with the accompanying drawings in which:

The novel electrode arrangement of the present invention is preferably used in conjunction with a primary cell, that is, an electrochemical cell in which a chemical reaction is employed to produce an electric current. Thus in the specification and claims which follow the term "anode" shall be understood to refer to the negative or oxidized electrode, while the term "cathode" shall be understood to refer to the positive or reduced electrode.

Figure 1:
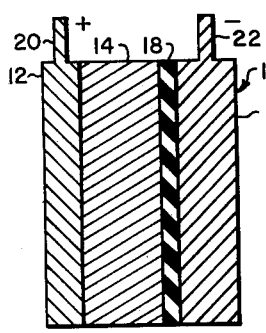
FIGURE 1 is a diagrammatic view of a single electrode unit used in the battery of our invention.

Referring now to the figures, where identical elements are afforded identical numerical designators, a cemented type electrode arrangement 10 is shown in FIGURE 1. The cathode 12 is in electrical contact and fixedly attached to the depolarizer element 14. The anode 16 is insulated by suitable nonporous material 18 from the cathode depolarizer subassembly. Conventional leads 20 and 22 are attached to the cathode 12 and anode 16. Cathode 12 and anode 16 are shown in FIGURES 1, 2, and 3 as substantially oblong in cross section and it is understood that the shape may be of any configuration.

Figure 2:
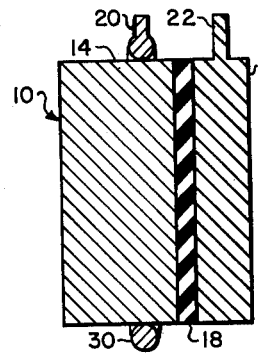
FIGURE 2 is a diagrammatic view of an alternate form of the electrode unit in the battery of our invention.

Referring to FIGURE 2, a modification of FIGURE 1 is shown wherein the cathode is in a form of a wire or rod 30 in electrical contact with the depolarizer 14. The structure of the battery is otherwise exactly the same as the structure illustrated in FIGURE 1.

A container or battery casing is absent from FIGURES 1 and 2 since the battery elements can be immersed directly in the sea or fastened in any suitable container. The structure shown may be fabricated of any appropriate battery materials known in the battery art and any compatible electrolyte may be used.

Figure 3:
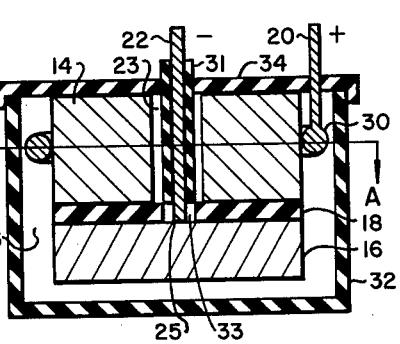
FIGURE 3 is still another alternate form of the electrode unit of our invention as used in a battery.
Figure 1A:
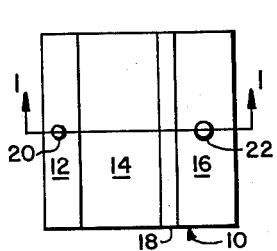
FIGURE 1A is a plan view of the single electrode unit shown in FIGURE 1.
Figure 2A:
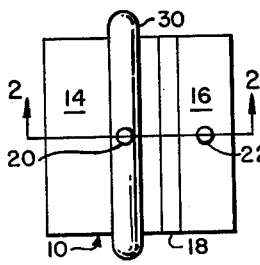
FIGURE 2A is a plan view of the alternate form of the electrode unit of the battery shown in FIGURE 2.
Figure 3A:
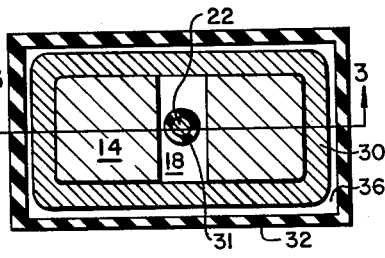
FIGURE 3A is a cross-sectional view taken along the line A—A in FIGURE 3.

Another modification of the cemented electrode arrangement 10 of FIGURE 1 is shown in FIGURE 3. The cathode is in the form of a wire or rod 30 surrounding the depolarizer 14. The anode 16 is insulated from the depolarizer 14 by the nonporous insulation material 18. The container or casing 32 having a suitable sealing cover 34 receives the battery element 10. A suitable electrolyte 36 operates to activate the battery element 10. Positive pole 20 is fixedly attached to the cathode rod or wire 30 and passes through the cover 34. Negative pole 22 passes through a passageway 23 and is fixedly attached to the anode 16 at the joint 25. Pole 22 is covered by insulation material 31 to prevent the pole from making electrical contact with the depolarizer 14. Pole 22 and insulation material 31 pass through the aperture 33 in the depolarizer 14 and through a similar aperture in the cover 34.

This invention relates to the structure of the battery elements and not to the materials used in the construction of the aforesaid components. Therefore, any of the known battery materials can be used in the structure if their physical and chemical properties allow them to be adapted to the structure of this invention. Some of the materials available for the anodes are; zinc, cadmium, magnesium, lead, iron, etc. Materials suitable for the cathodes can be silver, platinum, gold, copper, lead, etc. Depolarizer materials can be silver chloride, lead dioxide, silver bromide, silver oxide, cupric oxide, etc. Some electrolytes which can be used are lithium halides, fluoboric acid, perchloric acid, potassium hydroxide, ammonia, certain nonaqueous liquids, etc.

The battery elements illustrated in FIGURES 1 through 3 illustrate the basic structural invention and this structure. The structure can be modified to obtain batteries of subminiature size and/or flexible construction to allow for many applications requiring physical size peculiar to the aforementioned construction.

Figure 4:
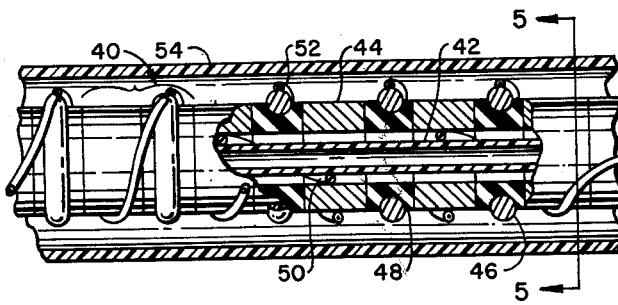
FIGURE 4 is a modification of the battery of our invention involving a plurality of cells and is a cross section taken along line 4—4 of FIGURE 5.
Figure 5:
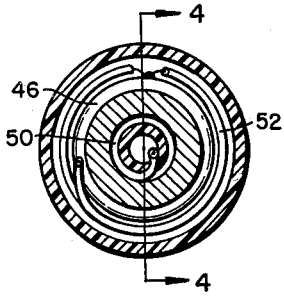
FIGURE 5 is an end view of the modification of the battery shown in FIGURE 4.

Referring now to FIGURES 4 and 5, there is illustrated a flexible battery containing a series of cells 40. A flexible tube 42 made of a suitable material such as plastic, rubber, or synthetic rubber products is used for the base or foundation on which the multiple cells 40 are mounted. An annulus-shaped depolarizer element 44 is affixed on the tube 42. The depolarizer elements 44 are alternated along the length of the tube 42 with the annulus-shaped anode 46. An insulator 48 prevents contact between the depolarizer element 44 and the anode 46. The insulator is made of any suitable nonporous material such as rubber, plastic, etc., and is annulus shaped and has a substantially U-shaped notch in its cross section. The cathode 50 has a form of a wire and is helically wound around the tube 42 making contact with each depolarizer element 44. Since the insulator 48 supports the anode 46 within its U-shaped notch the cathode 50 is insulated from the anode. Electrical contact is made between each succeeding anode 46 by a helically wound insulated lead 52 and is fixedly attached thereto such as by soldering. The battery may be extended to any length desired depending on the quantity of current to be generated. Possible elements which may be used for an undersea application include zinc for the anode 46, silver chloride for the depolarizer 44, and silver for the helically wound cathode 50. In the sea water application the battery can effectively operate with either salt or fresh water since the battery activation will generate its own salt material. A porous sleeve 54 may be used to retain the salts generated by the battery activation to keep the salt concentration of the electrolyte high in relation to the surrounding water and to protect the battery itself from objects on the floor of the body of water in which it is used.

Figure 6:
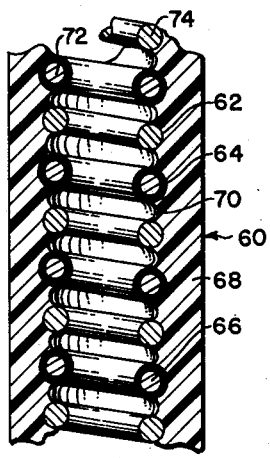
FIGURE 6 is a longitudinal cross section of a modification of the battery of our invention.
Figure 7:
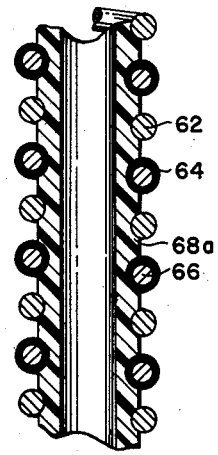
FIGURE 7 is a longitudinal cross section of another modification of the battery as shown in FIGURE 6.
Figure 8:
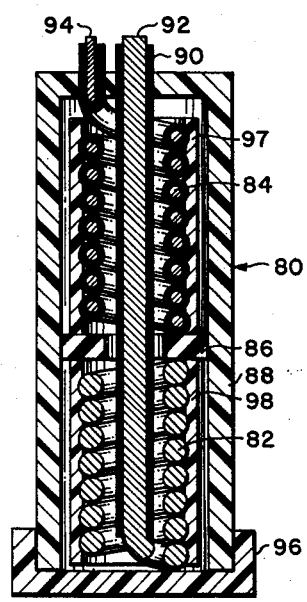
FIGURE 8 is a longitudinal cross section of another modification of the battery of our invention.

The basic arrangement of the cemented cell components illustrated in FIGURES 1 through 3 is shown in a modified form in FIGURES 6, 7 and 8. The purpose of the modification is to furnish a large electrode area, a short electrolyte path, and simplicity of construction. Referring now to FIGURE 6, the spiral or coil-type battery assembly 60 has an anode 62 having a coil or spiral configuration. The cathode 66, also in a spiral form, with a suitable depolarizer 64 attached thereto in the form of an encompassing outer layer. The depolarizer 64 may be placed upon the cathode 66 by any suitable means such as plating, cladding, or dipping. A portion of the depolarizer 64 must be removed from the cathode 66 to allow the cell to activate since a portion of the cathode must be exposed to the electrolyte. A suitable casing 68 surrounds the anode, cathode, and depolarizer assembly. The casing serves to position and support the anode and depolarizer-encased cathode. The casing 68 may be an adherent plastic either rigid or flexible to allow the battery components to be flexed in operation or in assembly to a major component. Alternatively, it may be a film such as adhesive tape or a thermo-shrinking film such as irradiated polyethylene. A suitable electrolyte is contained in the passageway formed by the coiled anodes and depolarizer-encased cathodes. In FIGURE 7 the support 68a is in the form of a rod and acts in the same manner as the support 68 in FIGURE 6 but allows the anode and cathode to be exposed outwardly rather than arranging them in the inward position as shown in FIGURE 6. The length of the battery is not limited and may be continued indefinitely. The positive and negative pole elements 72 and 74 may be situated at opposite ends or may preferably be wound alternately as shown. The area 70 acts as the insulation between the anode and cathode preventing the two components from being short circuited.

FIGURE 8 is a modified form of the spiral wound battery component shown in FIGURE 6 in which the anode and cathode are not alternated along the length of the battery. A depolarizer-encased cathode 84 is also constructed in a coil form and is shielded from the anode coil 82 by an annulus-shaped insulator 86. A portion of the depolarizer must be removed from the cathode to allow the cell to activate. A suitable casing 88 receives the battery components. One end of the anode 82 is directed externally from the casing 88 and has arranged thereon a nonporous insulating material 90 to prevent a short circuit from being created with the depolarizer-encased cathode 84. The negative and positive pole 92 and 94 extend from the anode and depolarizer-encased cathode, respectively. A cap 96 seals the unit from the atmosphere and the pole elements 92 and 94 are conducted externally of the battery from the opposite end of the casing 88. Suitable electrolyte added to the container activates the battery. Plastic tubes 97 and 98 keep the depolarizer-encased cathode 84 and anode 82 in coil forms within the casing 88.

Typical performance characteristics of a zinc-silver chloride battery having a sodium chloride electrolyte (sea water) with a configuration as shown in FIGURE 3 is presented in Table I. The volume of the complete battery tested was 30 cubic inches, the weight is 2.5 pounds, temperature is 68° F., and the load 13 milliamps.

*Table I*

| Time operation (days): | Output voltage (volts) |
|---|---|
| 10 | .95 |
| 100 | .92 |
| 200 | .91 |
| 300 | .88 |

For comparison a conventional style battery was made in which all the parts were identical except that the fronts of the electrodes were used instead of the backs and a separator was employed. When operated on the same load as the above battery the old style model ran only 100 days due to clogging of the separator. A new separator was installed replacing the clogged separator and another 180 days of service was obtained.

Table II shows the performance of a zinc-silver chloride battery having a sodium chloride electrolyte (sea water) with a configuration as shown in FIGURE 6. The volume of the battery was 0.177 cc., the weight being 0.4 grams, and the load being 17 ohms.

*Table II*

| | Time Operation (Minutes) | Output Voltage (Volts) |
|---|---|---|
| A. 1.5% salinity and operating at 0° C | 5 | .70 |
| | 10 | .74 |
| | 20 | .76 |
| | 30 | .75 |
| | 40 | .74 |
| | 50 | .69 |
| | 60 | .60 |
| B. 3.6% salinity and operating at 30° C | 5 | .86 |
| | 10 | .91 |
| | 20 | .92 |
| | 30 | .90 |
| | 40 | .97 |
| | 50 | .79 |

Table III shows the effect of load on output voltage at extremes of salinity and temperature for the same type of battery used to obtain the data shown in Table II.

*Table III*

| | Output Voltage (Volts) | Average Load (Milliamperes) |
|---|---|---|
| A. 1.5% salinity operating at 0° C | 1.03 | 0 |
| | .90 | 20 |
| | .80 | 30 |
| | .70 | 65 |
| | .60 | 85 |
| | .50 | 103 |
| B. 3.6% salinity operating at 30° C | 1.05 | 0 |
| | 1.00 | 9 |
| | .91 | 25 |
| | .90 | 42 |
| | .80 | 105 |
| | .70 | 142 |
| | .60 | 195 |
| | .50 | 250 |

Table IV represents a test using a radiosonde unit performed on a cell of the type shown in FIGURE 6 operating with a lithium chloride electrolyte. The cell volume was 0.52 cc., the weight was 1.2 grams, and the load was 10 milliamperes.

*Table IV*

| Pressure, mm. Hg | Temperature, °F. | Output, Volts | Time, Minutes |
|---|---|---|---|
| 760 (sea level) | 82 | .72 | 0 |
| 395 | 20 | .79 | 20 |
| 130 | −35 | .74 | 40 |
| 9 (100,000 ft.) | −60 | .67 | 60 |
| 9 (100,000 ft.) | −60 | .61 | 80 |
| 9 (100,000 ft.) | −60 | .59 | 100 |

Table V shows the effect of load on voltage for a battery of the type shown in FIGURE 6 constructed for exceptionally heavy loads. The electrolyte used was potassium hydroxide, the volume of the battery was 75 cubic inches, and the weight 3.5 pounds.

*Table V*

| Average load, amperes: | Time, Minutes |
|---|---|
| 16 | 1.5 |
| 14.3 | 2 |
| 12.5 | 3 |
| 11.5 | 4 |
| 11 | 5 |
| 10.4 | 7 |
| 10 | 9 |
| 9.5 | 11 |
| 8.5 | 12 |

The above tables have been included by way of example and not of limitation. While there have been described what at present are considered to be the preferred embodiments of the invention it will be understood by those skilled in the art that various changes and modifications may be made herein without departing from the invention and it is, therefore, aimed in the appended claims to cover all such modifications as fall within the spirit and scope of the invention. Examples of other types of batteries which can be adapted to our novel structure are: The Edison-Lalande zinc-copper oxide battery, the magnesium-silver chloride and magnesium-cuprous chloride battery, the Ruben-Mallory type zinc-mercuric oxide battery, and the zinc-silver peroxide battery.

W claim:

1. An electrode arrangement for a battery cell comprising: a cathode, a depolarizer element in electrical contact with said cathode and fixedly attached thereto, an anode in juxtaposition with said depolarizer element, and a nonporous insulating material interposed between said depolarizer element and said anode, said nonporous insulating material substantially covering the adjacent faces of said depolarizer element and said anode whereby exposing the nonadjacent faces of the electrodes to electrolyte produces a potential difference between the anode and the cathode.

2. An electrode arrangement as defined in claim 1 in which said cathode has a wire-like shape and circumscribes said depolarizer element.

3. An electrode arrangement as defined in claim 1 and, in addition, said depolarizer element and said insulation material have a passageway therethrough, a first pole element passing through said depolarizer element and said insulation material passageway, and a second pole element attached to said cathode.

4. An electrode arrangement for a battery cell comprising: a cathode, a depolarizer element in electrical contact with said cathode and fixedly attached thereto, an anode in juxtaposition with said depolarizer element, and a nonporous insulating material interposed between said depolarizer element and said anode, said nonporous insulating material covering the major portion of the adjacent faces of said depolarizer element and said anode whereby the nonadjacent faces of the electrodes are adapted to communicate with electrolyte and thereby produce a potential difference between the anode and cathode.

References Cited in the file of this patent

UNITED STATES PATENTS

| | | |
|---|---|---|
| 318,300 | Schaefer | May 19, 1885 |
| 359,055 | Brewer | Mar. 8, 1887 |
| 375,559 | McLaughlin | Dec. 27, 1887 |
| 2,605,298 | Marsal | July 29, 1952 |
| 2,641,622 | Higgins et al. | June 9, 1953 |
| 2,778,979 | Booe | Jan. 22, 1957 |